United States Patent [19]

Cohen et al.

[11] Patent Number: 4,837,798

[45] Date of Patent: Jun. 6, 1989

[54] COMMUNICATION SYSTEM HAVING UNIFIED MESSAGING

[75] Inventors: Roberta S. Cohen; Kenneth M. Huber, both of Middletown; Deborah J. Mills, Eatontown, all of N.J.; Myron E. Drapel, Lafayette, Col.; Janis R. Asterwesl, Corona Del. Mar, Calif.

[73] Assignees: American Telephone and Telegraph Company, New York, N.Y.; AT&T Information Systems Inc., Morristown, N.J.

[21] Appl. No.: 869,277

[22] Filed: Jun. 2, 1986

[51] Int. Cl.[4] .................. H04M 1/00; H04M 3/50; H04M 11/00

[52] U.S. Cl. ..................... 379/88; 379/94; 379/396

[58] Field of Search ............ 370/62, 60, 58; 379/88, 379/89, 94, 100, 67, 396

[56] References Cited

U.S. PATENT DOCUMENTS

| 4,612,416 | 9/1986 | Emerson et al. | 379/88 |
| 4,646,346 | 2/1987 | Emerson et al. | 379/214 |

FOREIGN PATENT DOCUMENTS

| 0157247 | 9/1983 | Japan | 379/89 |
| 0169262 | 9/1984 | Japan | 379/100 |
| 0214365 | 12/1984 | Japan | 379/88 |
| 0214366 | 12/1984 | Japan | 379/100 |
| 0248057 | 12/1985 | Japan | 379/100 |

OTHER PUBLICATIONS

"Electronic Switching Systems", R. Sugioka et al., Fujitsu Scientific & Technical Journal (Japan), vol. 21, No. 3, Jul. 1985, pp. 225-258.

"A Voice Mail System and Service Environment", K. Sakiya et al., Globecom 85, IEEE Globel Telecommunications Conf., Dec. 1985 (New Orleans, U.S.), Conf. Rec. vol. 1, pp. 4.3.1-4.3.6.

"ISDN in the Office-HICOM" (Siemens), Special Issue, telcom report and Siemens Magazine COM, Dec. 1985, pp. 1-111.

Primary Examiner—Thomas W. Brown
Attorney, Agent, or Firm—David H. Tannenbaum; David R. Padnes

[57] ABSTRACT

Unified messaging is a concept that provides for a single electronic mailbox for different types of messages. The mailbox can be on a user's host computer, PBX, PC, etc., and the user has consistant facilities available to originate, receive and manipulate messages. Messages can be translated from one media to another for reception, and a single message may be composed of parts that use different native media. The message recipient has a single controllable point of contact where all messages can be scanned and/or viewed.

34 Claims, 14 Drawing Sheets

MESSAGING CONFIGURATIONS
SWITCH BASED TEXT MAIL RECIPIENT

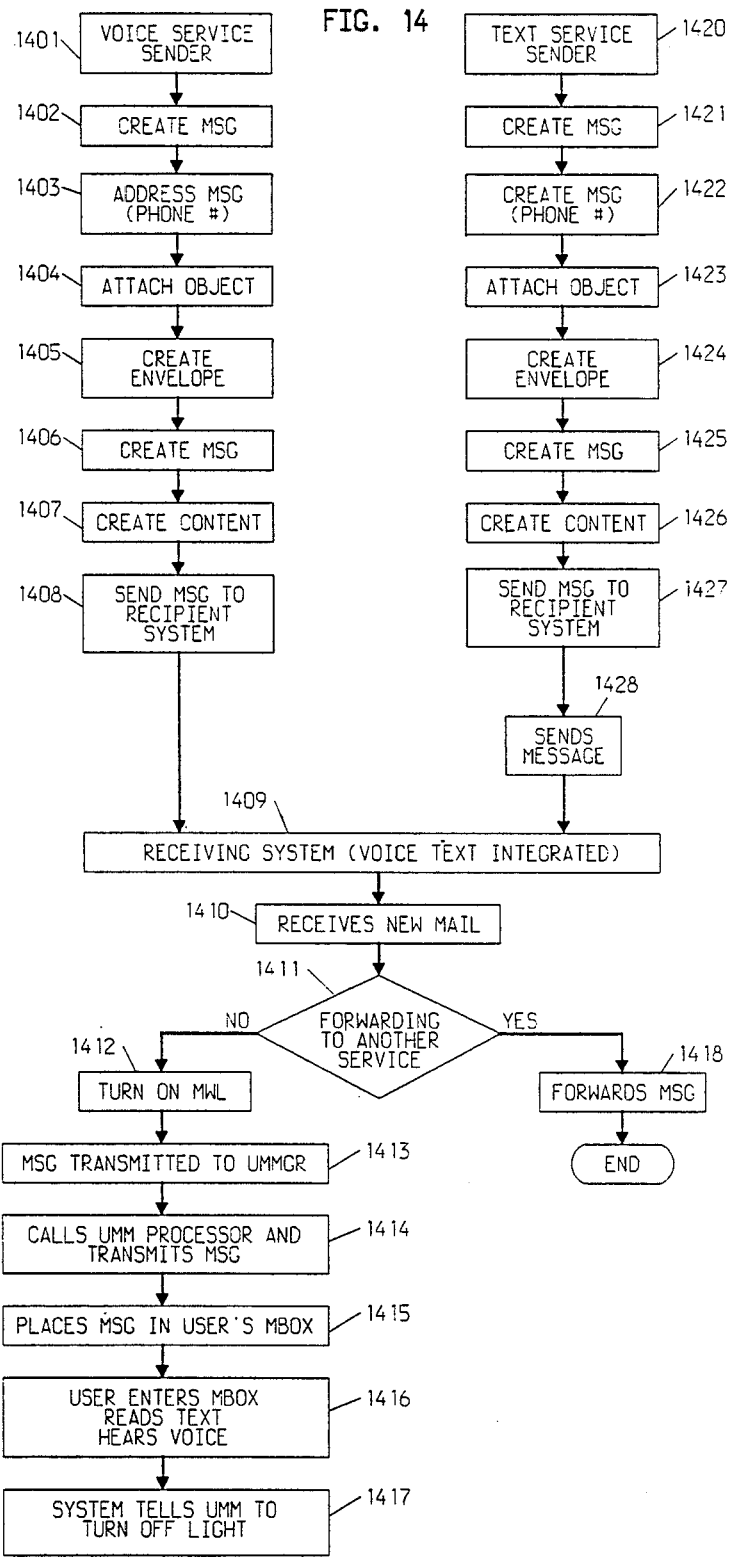

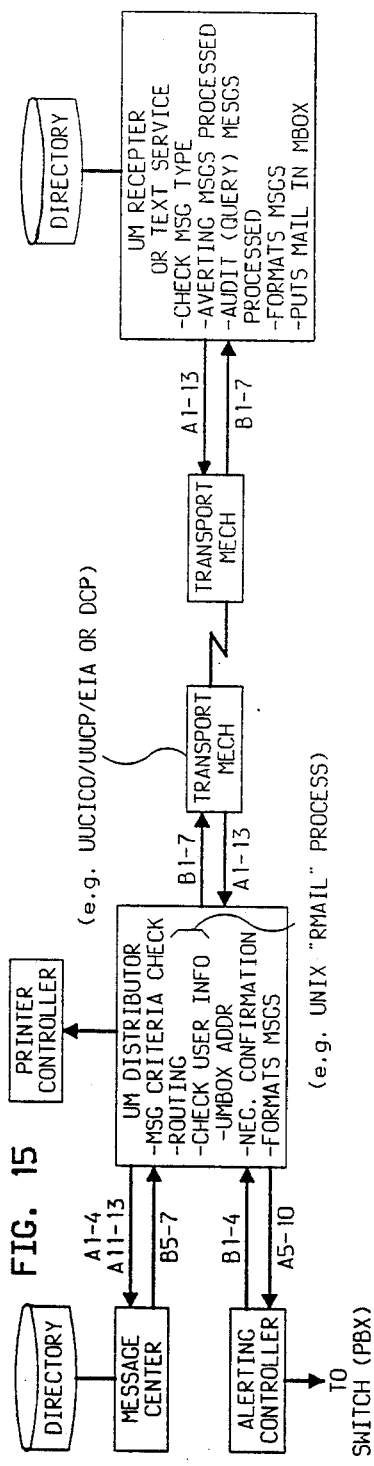

FIG. 15

MESSAGES FROM TEXT MAIL; SERVICE TO UNIFIED MESSAGING SYSTEM:

MSG #
A1-REQUEST TO FORWARD ALL CURRENT MESSAGES FROM MESSAGE CENTER TO MAIL SERVICE;
A2-UPDATE ITINERARY;
A3-TURN ON AUTOFORWARDING SO ALL MESSAGE CENTER MESSAGES (PINK SLIPS) GO TO MAIL SERVICE;
A4-TURN OFF AUTOFORWARDING SO ALL MESSAGE CENTER MESSAGES (PINK SLIPS) STAY IN MESSAGE CENTER;
A5-NOTIFICATION AUDIT RESPONSE (e.g. HERE IS THE STATUS OF WHAT SERVICES HAVE NEW MESSAGES WAITING FOR THE USER
   --IN RESPONSE TO AN AUDIT REQUEST FROM THE ALERTING CONTROLLER -B2);
A6-STATUS REQUEST FOR PRESENCE OF NEW VOICE AND PINK SLIP MESSAGES (RESPONSE IS PROVIDED IN B3);
A7-TURN ALERTING ON/OFF FOR ONE USER;
A8-TURN ALERTING ON/OFF FOR SEVERAL USERS AT ONCE;
A9-AUDIT RESPONSE FOR ONE USER (IN RESPONSE TO B1);
A10-AUDIT RESPONSE FOR SEVERAL USERS AT ONCE (IN RESPONSE TO B1);
A11-TEXT MAIL FOR MESSAGE CENTER RECIPIENT;
A12-QUERY STATUS OF FORWARDING;
A13-QUERY STATUS OF ITINERARY.

MESSAGES FROM UNIFIED MESSAGING SYSTEM TO TEXT MAIL SERVICE:

MSG #
B1-AUDIT REQUEST OF TEXT MAILBOX (RESPONSE IS A9,A10);
B2-NOTIFICATION AUDIT REQUEST (RESPONSE IS A5);
B3-QUERY RESPONSE FOR PRESENCE OF NEW VOICE MAIL OR PINK SLIPS (REQUEST IS A6);
B4-NOTIFICATION OF PRESENCE OF NEW VOICE MAIL OR PINK SLIPS;
B5-MESSAGE CENTER PINK SLIPS FORWARDED TO TEXT SERVICE;
B6-RESPONSE TO REQUEST FOR STATUS OF ITINERARY;
B7-RESPONSE TO REQUEST FOR STATUS OF FORWARDING.

COMMUNICATION SYSTEM HAVING UNIFIED MESSAGING

BACKGROUND OF THE INVENTION

This invention relates to communication system message notification systems and more particularly to such systems where messages received from various mediums are all reported to a user at a single point.

It has become common practice within the past few years to arrange a communication system to receive voice messages when a called party is unavailable. The received message is recorded and a notification, usually a lighted lamp, is given to the called party indicating the presence of a message that is waiting.

As data terminals become popular, people have begun to communicate over the data network by sending 'mail' messages to one another. These messages arrive at the called party's host computer and are queued waiting for the called party to request their presentation in display form on the screen of a terminal connected to the host computer. While this arrangement is a great step forward in the evolution of communication, it still presents problems in that terminals are not always available for use by a called party. For example, if a data message were to be sent to an electronic address and the addressee were to be away at a location remote from his or her host computer, the received message would not be available to the addressee. Of equal concern, the addressee would not even know that a message has been delivered.

The problems compound when users have several different electronic 'mail' services. Users must log on to each such service just to find out if messages are waiting. Then each message is retrieved from each service in a different manner and possibly using different terminals.

SUMMARY OF THE INVENTION

We have constructed a messaging system which allows a user (addressee) to specify one service as a central repository of messages which are delivered from/by any of the other services available to that user. For example, if a user has a voice mail service associated with a telephone station set and a data mail service available with a terminal (or PC), that use may specify either service as the recipient service. Thus, when a message arrives in either service, the notification of the arrival of that message is given only in the recipient service.

For example, assuming that the user has selected the data mail service as the recipient service, then a voice message which arrives via the voice service would cause a message to be displayed on the data terminal associated with the host computer serving the mail service indicating that a voice message has arrived. The user could then retrieve the voice message in the normal manner via the voice terminal or the user could view an abstract of the message on the terminal screen. On the other hand, assuming that the user had signified that the voice service was to be the recipient, then the lighted lamp, or other means, associated with the voice terminal would indicate that messages have arrived. The user then would attempt to retrieve the messages and would be told that some of the messages which are waiting are electronic messages available at the terminal. The user, in one embodiment, could then request via the voice terminal that the data message be converted to speech so that the user could hear the message even though no data terminal is available. Some voice terminals have data displays associated with them. In such situations, the data message can be retrieved via the voice terminal display.

BRIEF DESCRIPTION OF THE DRAWINGS

These and other objects and features, together with the operation and utilization of the present invention, will be more apparent from the illustrative embodiment shown in conjunction with the drawings in which

FIGS. 10-14 show flow charts of message processing; and

FIG. 15 shows a block diagram of our message system.

GENERAL DESCRIPTION

Figure 1:
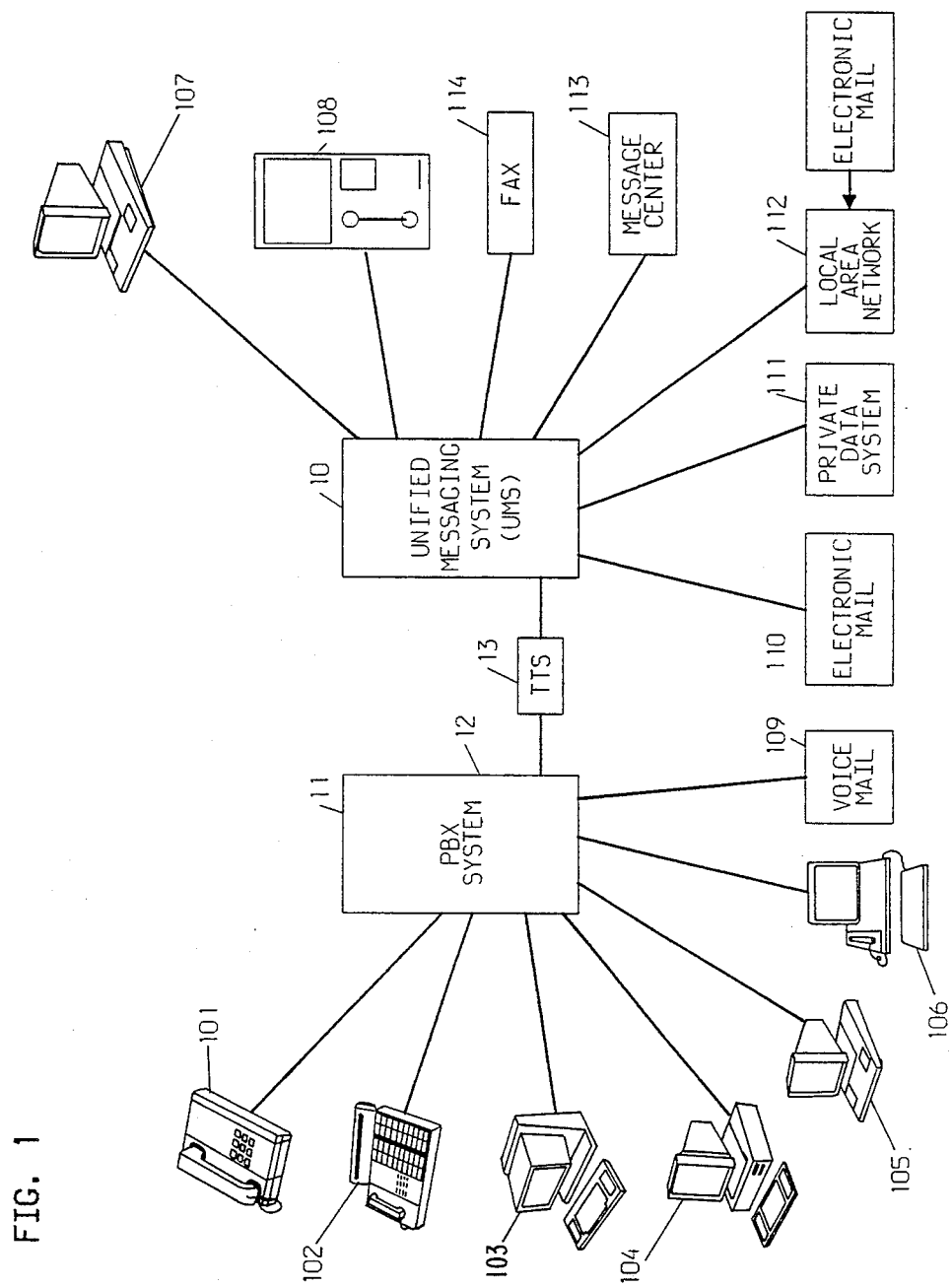
FIG. 1 is an overall block diagram of our system.

The unified messaging system (UMS 10), shown in FIG. 1, is based on several basic principles of integration that underlie all aspects of our messaging system. These fall into three areas. First, UMS provides guidelines for a basic set of consistent service attributes such as unified messaging mailbox, unified messaging retrieval and unified messaging preparation. Secondly, user interface guidelines are established for messaging services to give users a consistent set of names and semantics for all messaging services. This is provided by unified alerting/notification and unified message retrieval commands Finally, UMS provides an underlying application architecture, or unified connectivity, that enables all messaging services to communicate with each other.

Unified messaging system 10 is the one access point for all messages regardless of the message type and regardless of the message origination. This capability is made possible by an underlying message transfer architecture, to be described hereinafter, that forwards messages and message notifications from one service to another. Forwarding can be done automatically under system control, or under direct control by the user.

Users are able to retrieve messages from their chosen unified messaging mailbox using any of several terminal types, such as, for example, terminals 101-108, from any location, local or remote. Thus, a user has unified access to any messaging service such as, by way of example, electronic mail 110, voice mail 109, private data system 111, local area network 112, message coverage 113 or fax 114. Some of these services, as shown, are controlled directly from PBX 12 and some by unified message system 10.

Depending upon the technological limitations of some retrieval devices or some message services, however, users may only be able to retrieve parts of a message or messages in certain forms. For example, from a data terminal (103-107) a user can retrieve only the voice mail header or abstract identifying the sender, date, time, etc. Using this header information, a user could select the desired message and hear the entire voice message on an associated voice station 101-102. A limited display telephone 102 can only retrieve abstracts and short messages. Text-to-speech converter 13 uses the well-known text-to-speech technology for media conversion so that most types of messages can be retrieved in voice form from a conventional voice telephone 101,102.

Message senders are able to create a message without knowing the recipient's retrieval system or retrieval device. For instance, an electronic mail user can create a meeting notice and send it to several people. These recipients may or may not be electronic mail users. One recipient may receive the meeting notice from (1) the United States Postal Service via an electronic paper mail gateway; (2) through text-to-speech conversion; or (3) by calling the message center agent. Yet another recipient may receive the meeting notice on a personal computer. In each case, the sender simply creates the meeting notice, enters the names and addresses of the recipients in a consistent way and sends the mail without having to be aware of the recipients' retrieval services or retrieval devices. It is the recipient who designates one of his/her services 109-114, as the receptor service and all messages, or notifications of messages, go to the designated receptor.

Whenever a user-designated receptor receives a new message, be it text, voice or facsimile, that user is alerted to that fact. Alerting is achieved, for example, by lighting message waiting lamp (MWL) 20 (FIG. 2) which is part of face plate 201 of users' voice terminal 101 or 102 (FIG. 1). Alerting on data terminals is achieved by activating the terminal screen indicator on electronic terminals Users see the illuminated lamp or screen indicator and may then enter their receptor service in the prescribed manner to retrieve their messages Notification of new messages is done within the mailbox by icons or single-line entries on the screen. In cases where messages cannot be forwarded, these notifications tell the users where they have new messages on other services.

Figure 2:
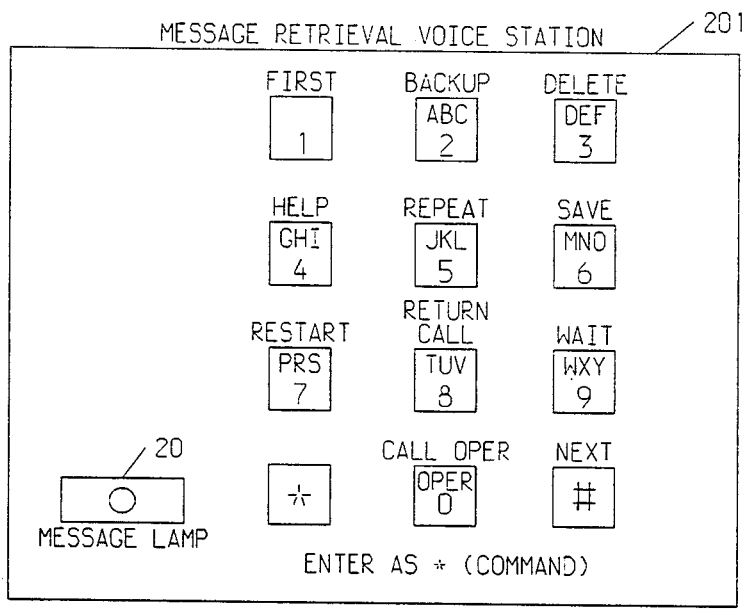
FIG. 2 shows a typical key pad and alerting device.

A consistent set of message retrieval commands is available from every terminal FIG. 2 illustrates the layout of the basic message retrieval commands that are available via the typical voice terminal key pad. This interface is used, for example, for voice store-and-forward services and for text-to-speech retrieval of text messages. These same message retrieval commands could be available on limited-character display terminals, and on full screen terminals.

DETAILED DESCRIPTION

Figure 3:
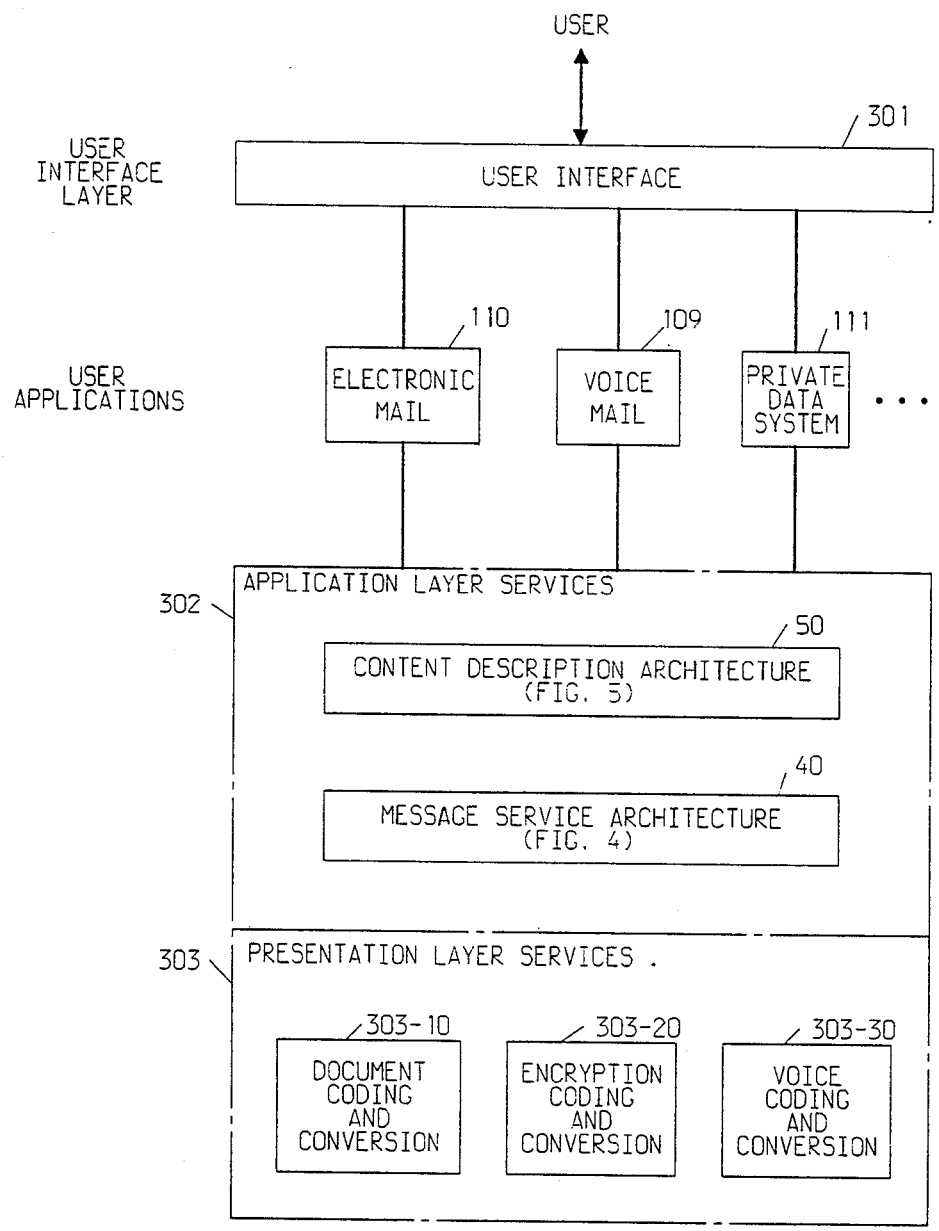
FIGS. 3-5 show a block layout of the control structure for our system.

FIG. 3 shows the control or application architecture for the described system. The goal of the application architecture is to provide a basis for interoperation and cooperation between applications distributed throughout a network, and to ensure a consistent end-user view of basic communication services across various products. The application architecture includes an application layer 302, a presentation layer 303, as well as a user interface layer 301.

The user interface layer 301 is the end-user point of interaction with the system. It defines standard formats and capabilities for collecting use input and for displaying information (including feedback, error messages and data) to the user. User applications (109, 110, 111) can also make use of the user interface layer 301 services to collect user input and to display information in standard ways.

As shown in FIG. 3, application layer 302 includes two major components, namely, (1) message service architecture 40 which contains application independent transmission related services that support store-and-forward message delivery and application specific service functions, and (2) content description architecture 50 which provides a standard way of identifying and describing contents across dissimilar systems.

The presentation layer 303 handles protocol negotiations between peer applications concerning the choice of formats for representing information for transmission (the choice of transfer syntax). Presentation layer 303 services also define such functions as document coding and conversion (303-10), encryption coding and conversion (303-20), and voice coding and conversion (303-30).

Figure 4:
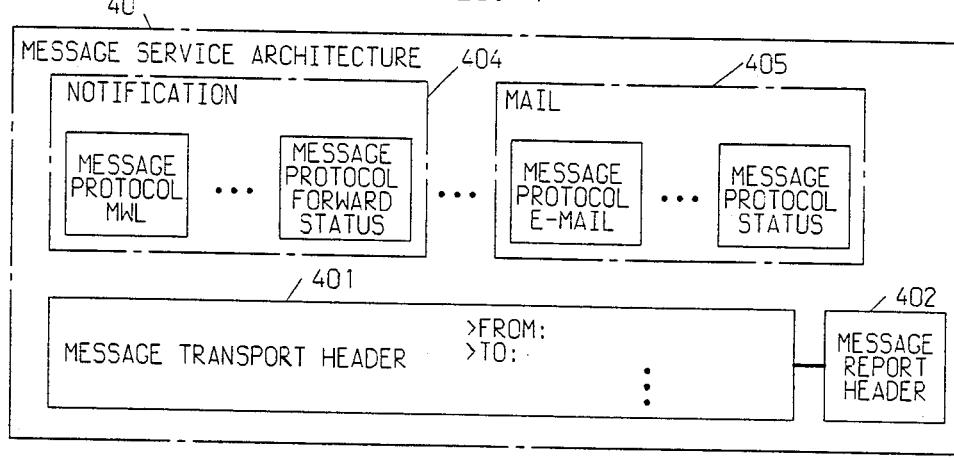

As shown in FIG. 4, message service architecture 40 contains three components; message transport header 401, message services protocols 404-405 and message report header 402.

Message transport header 401 is the message envelope that contains information relevant to the transmission of the message: the origination and destination addresses, a time-stamp and various transport options (e.g., grade-of service). Message report header 402 is used to return transmission related status information. Message services protocols 404-405 contain functions required by specific messaging applications such as electronic mail 405 (e.g., copy-to, subject) and notification services 404 (e.g., message waiting indicator, message forwarding).

To digress momentarily, FIG. 15 details the messages exchanged between the unified messaging system (UMS) and the mail service. The messages fall into four categories of actions: (1) update, (2) query, (3) response, and (4) notification. Update messages include requests for updating the alerting mechanism (e.g., turn the lamp on/off), requests for updating the itinerary information stored on the call coverage (message center) service for accurately answering phone calls and requests for updating forwarding status (e.g., turning the autoforwarding on/off from the call coverage service to the mail service). Queries are used to ask for accurate status information (e.g., is the forwarding on/off, what is the latest itinerary information, is there new voice mail waiting, etc.) and the responses are used to reply to the queries. Notifications are sent from the UMS to the mail service to notify the users of the presence of new messages in their other messaging services.

Figure 5:
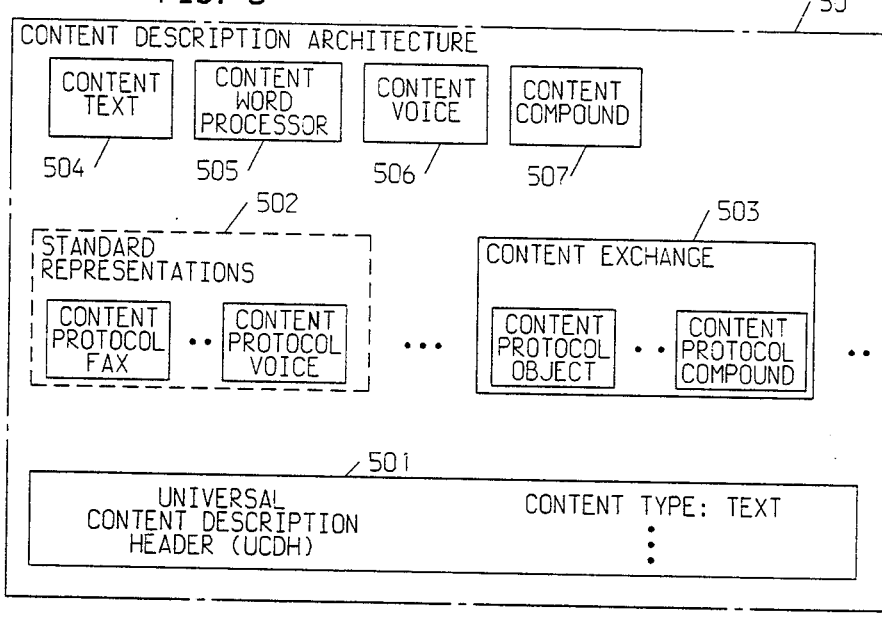

FIG. 5 shows content descriptor architecture 50 which describes the contents of the message. Contents may be as simple as a user-entered text message or as complex as a voice message embedded in a word-processing document containing a graph and spreadsheet. The basic structure of content descriptor architecture 50 parallels that of the message service architecture. It consists of the unified content description header (UCDH 501), content services protocol and the described contents The UCDH 501 contains fields describing the type, encoding characteristics and length of the contents It is entirely adequate for describing simple contents (e.g., an unformatted text message) or contents having well-defined and standardized structures. The content descriptor architecture 501 also provides functions for describing non-standard structures.

Following the UCDH are the content services 502, 503. These services provide additional information regarding the content sent with the message 401, 404, 405. This information might include the specific format of the content, the type of application used to create the content, the date of creation, the author's name, etc. Finally, the actual contents follows 504, 505, 506, 507.

This is the content that was fully described by 501–503 so that the receiving system has enough information to process the contents.

Figure 10:
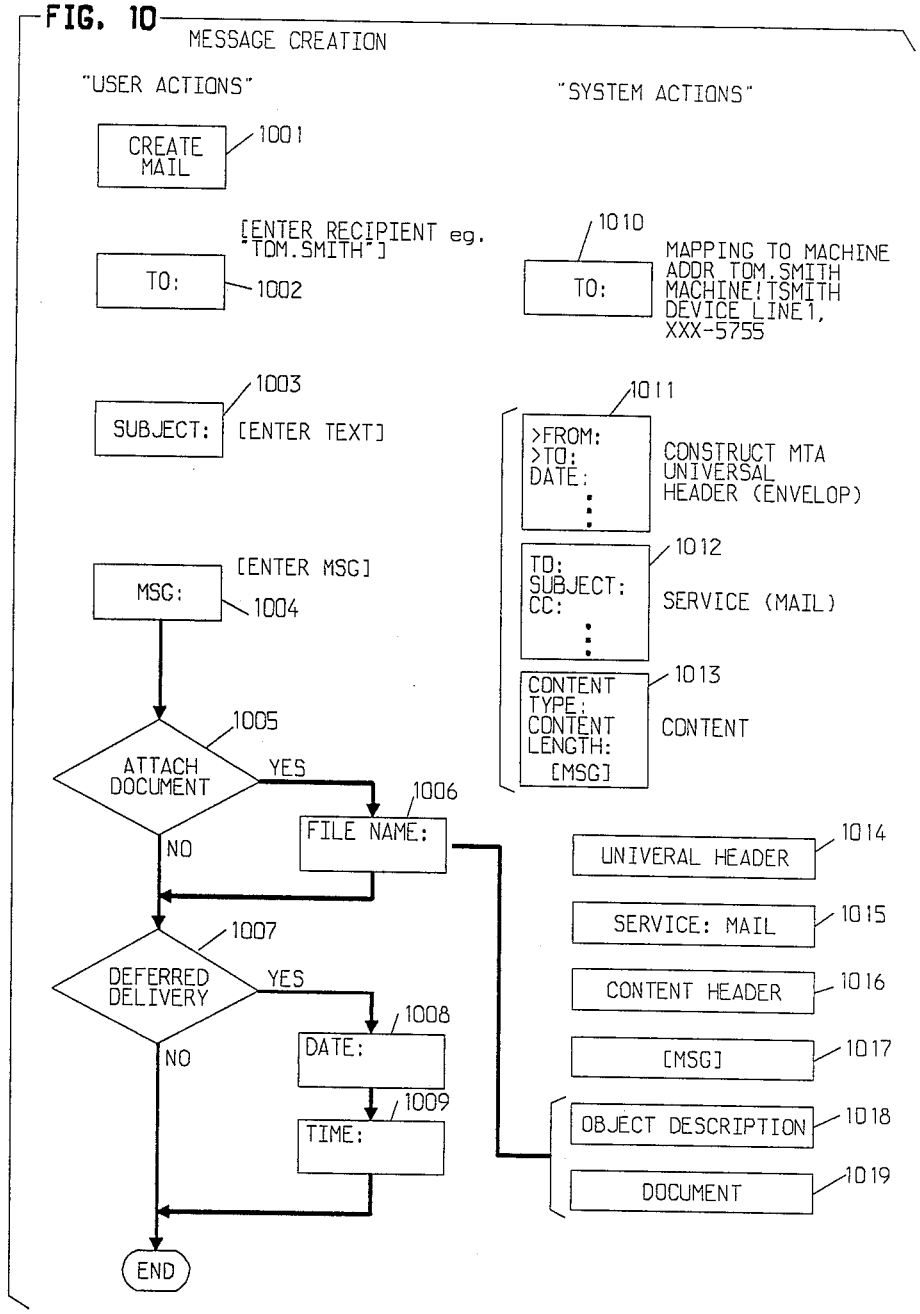

A user agent (UA) process on the user's actual messaging service takes the information provided by the sending user (FIG. 10: 1001, 1002, 1003, 1004, 1005, 1006, 1007, 1008, 1009) and formats it according to the architecture (FIG. 10: 1010, 1012, 1013, 1015–1019) for the particular service. The user agent process then passes this formatted message to a message transport agent located within the user's particular service. The MHS.ASCII is responsible for transmitting the message. It takes the message from the UA and creates the "envelope" for the message (FIG. 10: 1011, 1014). Once the envelope is constructed, the MHS.ASCII takes the necessary steps to assure accurate transmission of the message to the destination service.

The architectural model underlying MHS.ASCII is derived from CCITT's Messaging Handling System (MHS), the international standard for exchanging electronic mail messages. The application layer services provided by MHS.ASCII are a superset of those defined by MHS. With respect to presentation layer services, MHS.ASCII is American Standard Code for Information Interexchange (ASCII) coded, providing compatibility with standard AT&T UNIX ® Operating System mail and a human-readable format. In contrast, MHS is binary encoded. Thus, if the underlying protocol layers are compatible, communication between message Transfer Architecture and MHS services requires a straightforward conversion at the presentation layer.

SPEECH CODING

Digital encoding of speech is an old technology, presently used in extensively deployed digital carrier systems. Pulse Code Modulation (PCM) is the most commonly used method, encoding voice into 56 or 64 Kbps. The encoded voice form is a well-defined standard (although two versions exist internationally). More recently, Adaptive Differential Pulse Code Modulation (ADPCM) techniques have been developed that reduce the voice coding rate to 32Kbps, yet retain "toll quality" fidelity. Standards are also in place for these algorithms. When voice coding and storage is intended to occur in customer premises equipment, product designers frequently compromise voice fidelity slightly to obtain reduced storage requirements by using a lower encoding rate.

TEXT-TO-SPEECH CONVERSION

Unified messaging retrieval is greatly enhanced by use of text-to-speech technology. This technology allows text message retrieval when the user is at a voice-only instrument. ASCII text is subjected to format processing (e.g., for abbreviations), syntactical analysis and letter-to-phone-me conversion. The resulting representation of phone-mes and stress marks is converted to sound by a set of rules that drive a speech synthesizer. Dictionaries are included to provide proper sounding phone-me strings for words and names that would be incorrectly pronounced by the ASCII-to-phone-me translation algorithm. Text-to-speech algorithms are implemented on a single circuit board and work in real-time.

Turning now to FIGS. 6–9, let us look at a service of scenarios to see how the unified messaging system operates in typical environments. Since, as discussed, a goal of the unified messaging system is to provide users with a single point of message retrieval, one conceptual message box (universal mailbox) is established for each user. This can be established, ideally, under user control. A second goal is to provide a single, common alerting when messages are received in the universal mailbox. The user has the choice of where (i.e., in what controlling service) the universal mailbox will be located. This is accomplished, for example, by users instructing their other messaging services to forward their messages to the unified mailbox. This can be done from the users terminal or by a central administrator. The universal mailbox will be referred to as the prime message receptor and can be classified into one of four message servers:

(1) a switch (PBX) based text messaging service;
(2) a switch (PBX) based voice messaging service;
(3) a stand-alone text messaging service; and
(4) a stand-alone voice messaging service. Each of these four major categories will now be described.

Figure 6:
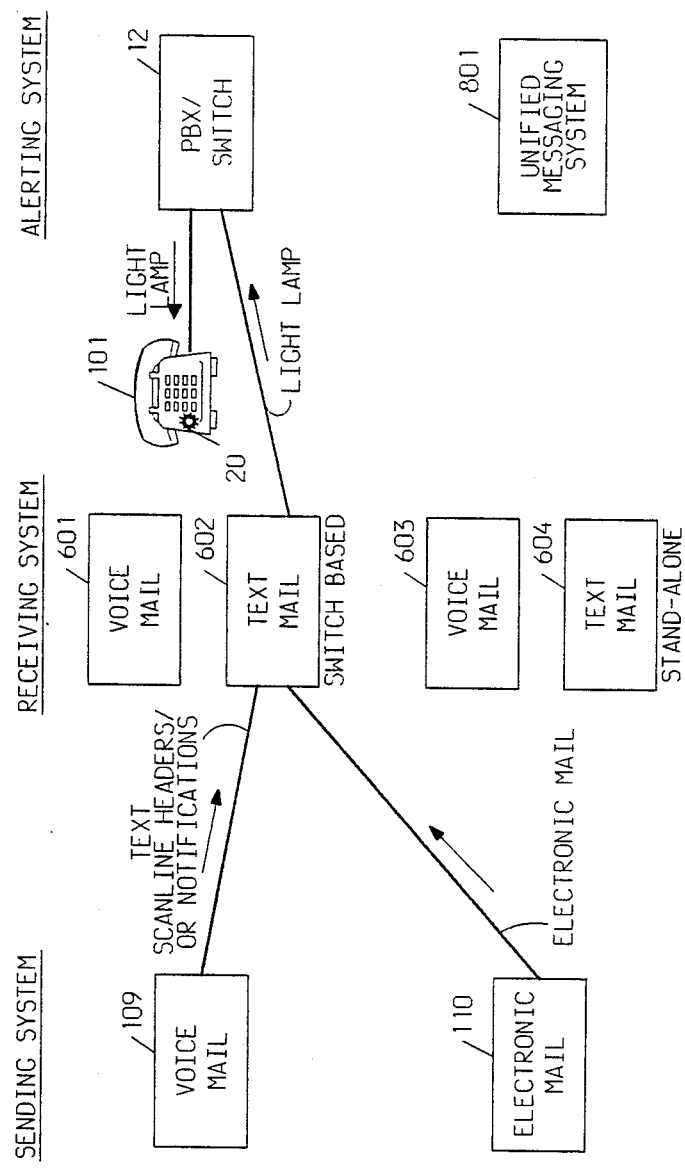
FIGS. 6-9 show various message scenarios.

FIG. 6 shows a switch based text messaging service which can receive text (data) messages from any remote text messaging service, such as electronic mail service 110 of a message sender, that supports the MHS.ASCII protocol. Services 109 and 110 are advantageously sending user controllable software residing on any processor associated with the sending user. Services 601 and 602 are receiving user controllable software residing on processors integral with PBX switch 12. Services 603 and 604 are receiving user controllable software residing on stand-alone processors.

When the receiving text messaging service cannot accept voice messages and the sending service is a voice service, such as voice mail 109 (which can be the well-known Audio Information Exchange Service provided by AT&T), the receiving service can still provide text notifications of messages intended for the end-user, provided the sending service transmits some information pertaining to the message. This information can be the scanline headers or notifications associated with each message. These notifications are used to announce the arrival of new mail in the remote system (e.g. "You Have Voice Mail"). Complete header, or abstract, information is sent instead of notifications when the sending service can support header creation and transmission (e.g. "32 second voice mail from Bill Evancho at xxx-5555 delivered at 12:15 am on April 15"). When new mail or notifications arrive at the text mail service, the associated PBX switch 12 is signaled to alert the end-user to new messages. This alerting can be the lighting of lamp 20 at voice terminal 101.

Figure 7:
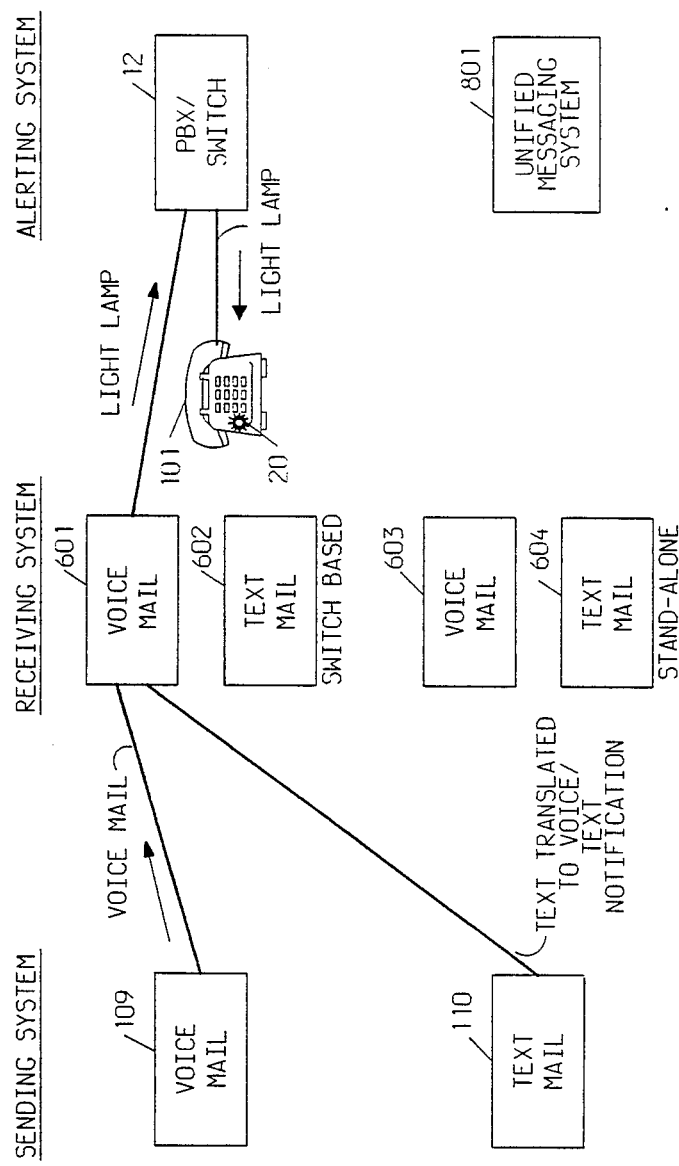

FIG. 7 shows a switch based voice messaging service which receives voice messages from all remote voice messaging systems that support the MHS.ASCII protocol. Remote text messaging services can deliver to the voice messaging system either (1) the entire message using conventional, well-known text-to-voice translated information; (2) headers about the text information stored on the remote text system (e.g. "text mail of 532 characters, from Tony Selemi, at 3:20 pm on 4/17, subject: meeting cancellation"); or (3) a notification message (e.g. "You Have Text Mail"). As discussed above, when new messages arrive at the voice messaging service, the associated switch is signaled to alert the end-user to new messages.

Figure 8:
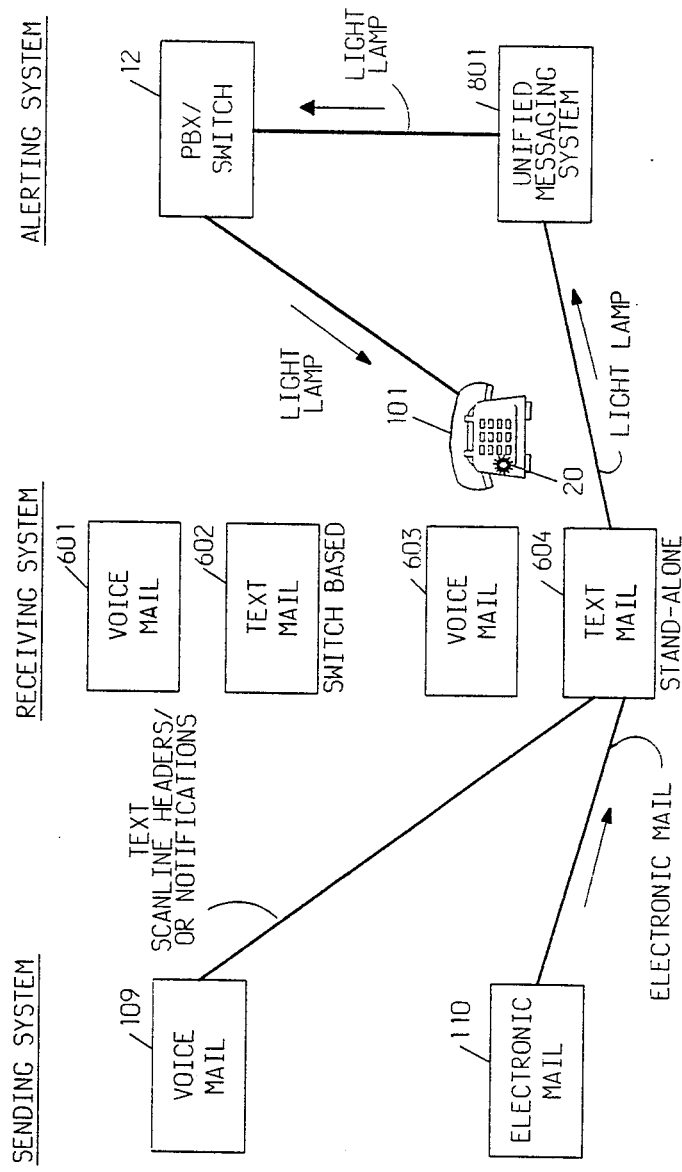
Figure 9:
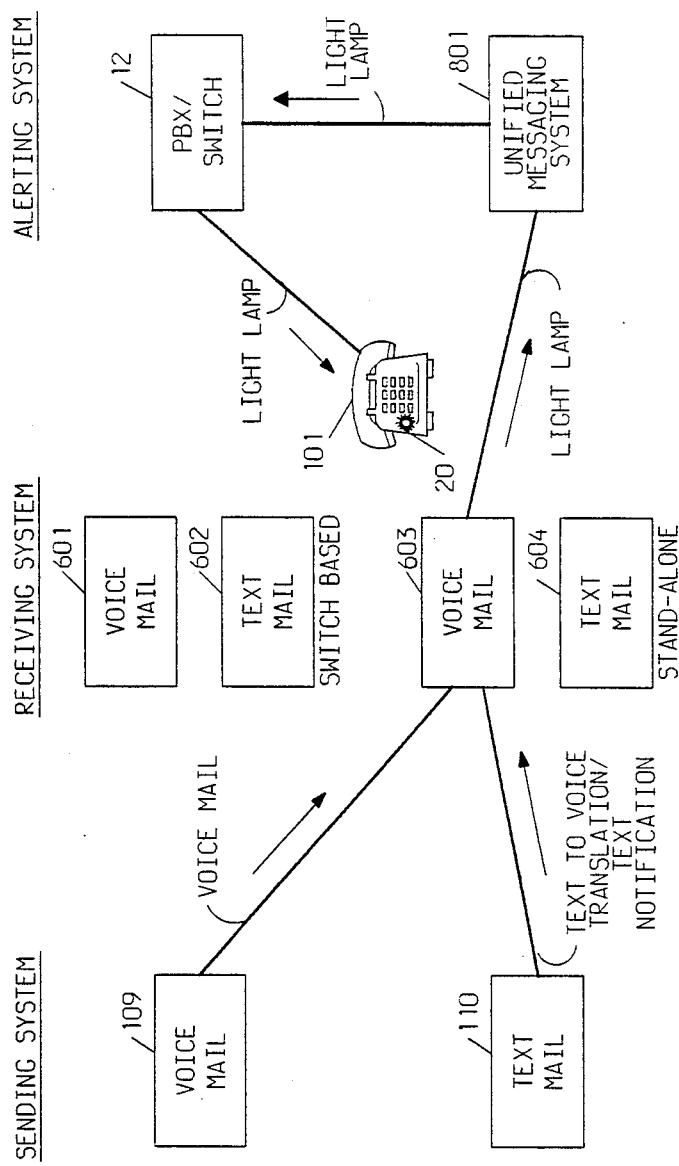

FIG. 8 shows a stand-alone text mail service where messages are received exactly as in scenario 1 (FIG. 6). However, the alerting function is achieved by means of a message request sent from text messaging service 604 to switch based processor 12 via unified messaging system 801. Unified messaging system 801 is processor resident software residing on any system processor, including PBX switch 12 processor. Software in the unified messaging system 801 exchanges a protocol with switch 12 to provide commands for lighting and extinguishing alerting lamp 20 of voice terminal 101. FIG. 9 shows a stand-alone voice messaging service where messaging is provided, as in scenario 2 (FIG. 7), and alerting is provided, as shown in scenario 3 (FIG. 8).

As shown in FIG. 10, the user enters his or her mail service and requests to create a mail message (e.g. CREATE MAIL 1001). The service asks the user for the first recipient (TO 1002) and the user enters the recipient's name, "Tom Smith". The application also asks the user for more (TO), for copy-to recipients (CC) and for blind-copy recipients (BCC). The service asks the user for a subject, (SUBJECT 003) and the user can enter some information to serve as a subject. The service asks the user to enter a message and the user does so. The service, blocks 1004–1009, asks the user if he/she wishes to attach a document (such as a spreadsheet, graph, memo, etc.). If the user does want to attach a document, the application asks the user for information regarding the document, for example, the document name, file folder, keywords, etc. If the user does not wish to attach a document, or when the document attaching request is completed, the application asks the user if he/she wants to defer delivery of the message for a later time. If so, the user supplies the necessary information, for example, the date and time.

The information obtained by the service from the user's input is formatted according to the underlying architecture, as shown in FIGS. 3, 4 and 5. Each component of the message is formatted in a "keyword: value" structure. The recipients' names are mapped to a logical and a physical address for connecting to the recipient's receiving application (i.e. the destination address). This could take the form of a device line number and a telephone number, block 1010. The software control to perform this function is now well-known.

A universal header is created, block 1011 (FIG. 4, message transport header 401), from the information supplied by the user, for instance, the user's name and address (logical and physical), the names and addresses of the recipients, the date and time the message was created, deferred delivery information, and specific information about what follows such as the type of message. A service protocol is created, block 1012 (FIG. 4, mail 405), including service information which includes the recipients' names (and addresses if supplied) as entered by the user, the subject, sensitivity, etc. The actual message (e.g. "Please meet me for lunch outside the cafeteria") is also formatted with descriptive information regarding the type of the message, for example, TEXT, and the length of the message, block 1013 (FIG. 5, 501, 502 and 504). If the user had attached a document, for example a spreadsheet, the application would also format a header (FIG. 5, 503) to send along with the spreadsheet describing information regarding the spreadsheet such as the application that created it, its length, its internal format, its date and time of creation, any encoding/encryption information, etc.

When all this formatting is completed, blocks 1014–1019, the mail message contains headers and contents in a structured way, interpretable by the receiving processor(s). The mail message is now ready to be sent to its destination(s).

Figure 11:
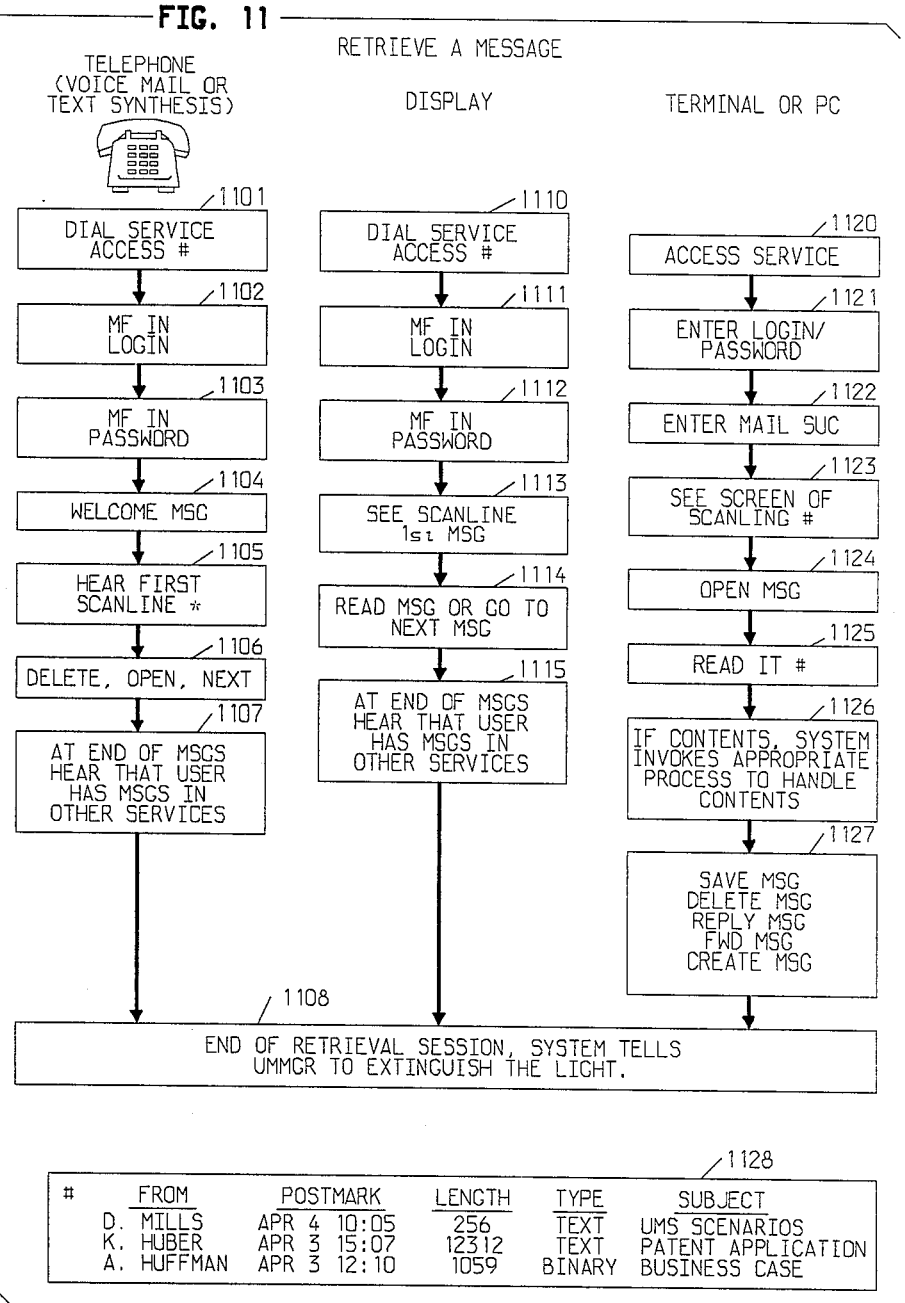

As shown in FIG. 11, the user can retrieve messages from the unified mailbox via several different retrieval devices. This section details the retrieval process depending upon the retrieval device. In most of these cases, the user is retrieving the message because he/she has been alerted that there are new messages. This alerting could be accomplished through the illumination of a light on the voice or data terminal. Alerting for all messages, regardless of which service sent the message, is via a single service, called the receptor service, by the recipient user.

Several different message retrieval scenarios are shown in FIG. 11. Using a multi-frequency (MF) voice telephone terminal, the user picks up the receiver and accesses the message receptor service 1101 by dialing a particular number, a dial access code, or a feature button on the telephone. The user enters the login 1102 via the MF button and enters a password 1103 (optionally). At this point, the user might hear a welcome message 1104. The user can either go directly into the retrieval process or execute another command available on the service. When entering the retrieval procedure, the user might hear the first scanline (header 1105) of the first message. This could sound like, "Thomas Smith x3887 called on April 4th at 10:15 am, the message is 20 seconds long". The user could listen to this message or skip to the next header and decide if he/she wanted to hear that message. At any time, the user has the ability 1106 to stop the retrieval session, replay a message, delete a message, save a message, skip a message, etc. When the user has completed retrieving the messages, the service 1107 might tell the user that there are new messages waiting in other services, thereby notifying the user of the presence of new messages not in the voice service. When the user has finished with all the messages in all the services, the receptor service tells the other services to turn off the user's message waiting indicator.

FIG. 11, blocks 1110–1115, show a situation where the user is retrieving the messages from a voice terminal with an integrated limited data display set, (FIG. 1, 102) such as a 40-character display set. Access to the message receptor service is the same as discussed above, as are the login and password and welcome message steps. However, instead of hearing the header of the message, the header is displayed to the user on the 40-character display and would appear as "T. Smith x3887 April 4 10:15 am". From this point, the same message manipulation options, as discussed above for the voice terminal, are available, and the system operates in the same manner.

In FIG. 11, blocks 1126–1127, show a situation where messages are retrieved from the unified mailbox through a data device, such as a data terminal 103 (FIG. 6) or a Personal Computer (PC) 104 (FIG. 1). The user accesses the application in which the unified mailbox resides. This access can be accomplished through a variety of means, such as a hardwired connection, a local area network (LAN), dial-up lines, etc. The user may enter a login (username) and a password and then request to enter the messaging service. When retrieving mail, the user sees a scanline of message headers, as shown at the bottom of FIG. 11. As discussed above, the user is free to manipulate those messages (open, delete, save, reply, forward, etc). The user can read the messages. If a message has an attachment 1126, the service could invoke an editor capable of handling that attachment. This service also notifies the user of messages waiting in other messaging services which did not or could not forward their messages to this unified mailbox. If this data device has an associated voice device, the user may hear voice messages from the voice service.

Figure 12:
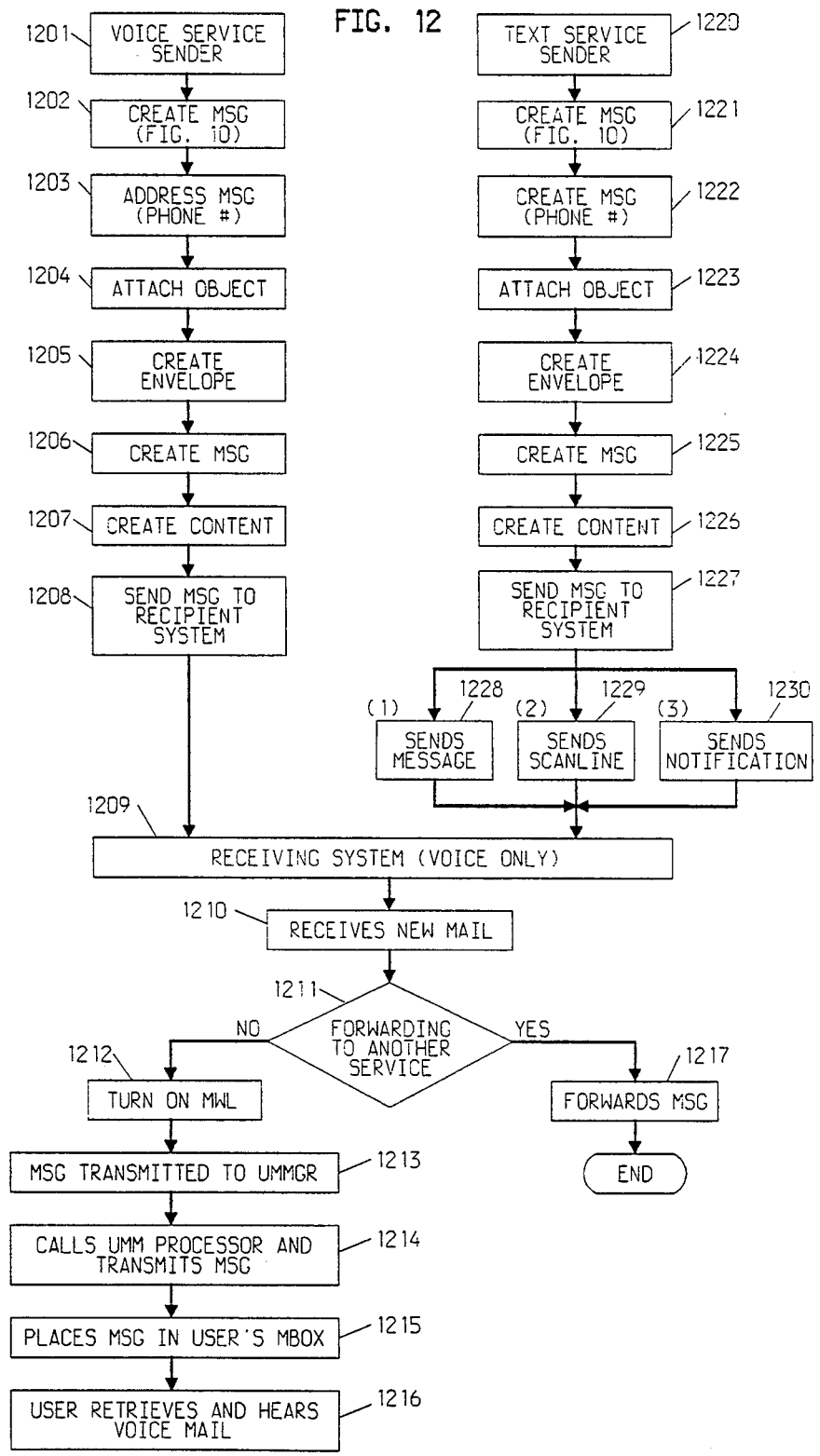
Figure 13:
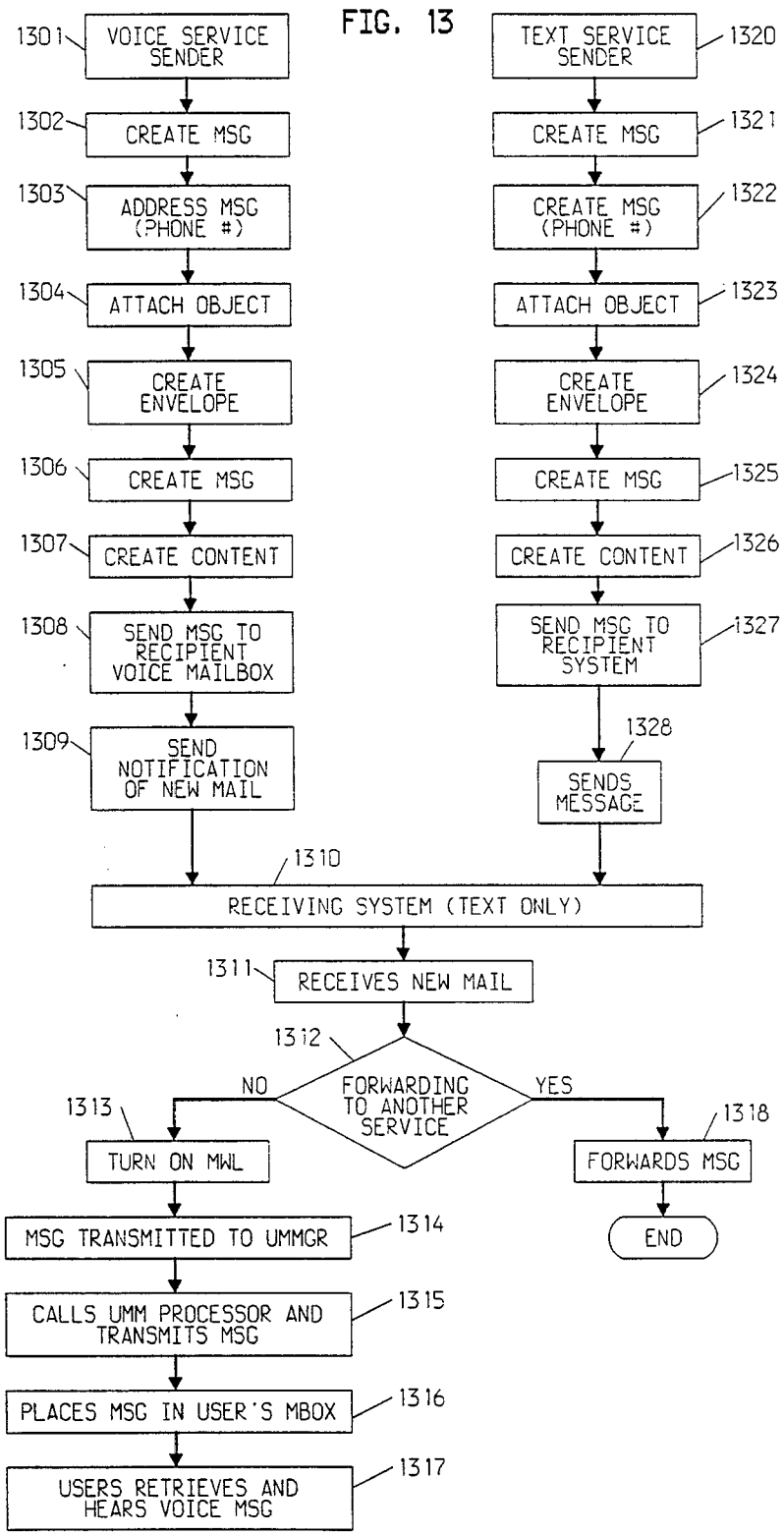

FIGS. 12, 13 and 14 detail the originating and sending of messages. In FIG. 12, blocks 1201-1208, the prime message receptor is a voice-only mailbox. When the sending system is another voice application, the voice message is formatted appropriately, as shown in FIG. 10, and sent to the prime message receptor. When the sending system is a text-based messaging service, blocks 1220-1230, there are several ways that the message, or information regarding the message, can be sent to the voice-based prime message receptor. These are 1. The text service can send the entire message as if the destination service were also text-based; the message will be converted from text to voice and will be retrievable from the voice-based prime message receptor;

2. The text service can send the header of the message which will get converted to voice and will be retrievable from the prime message receptor; or 3. The text service can notify the voice-based prime message receptor that the user has new text messages. When the service with the voice-based prime message receptor receives both voice and text-to-speech converted messages, it first checks to make sure that the user is not forwarding messages to yet another service. If the user is, then all these messages get forwarded to that service. If not, then the service tells the switch (or the service actually controlling the terminal) to turn on the user's message waiting indicator. This alerts the user to the fact that there are new messages. The messages are retrievable from the prime message receptor, as discussed above. In the case of text messages converted to voice, users manipulate the messages as they do other messages. If the user just receives a voice version header of the text message, the user may request that the sending text application forward the entire message over for retrieval from that point. When all the messages are retrieved, the service tells the switch to turn off the user's message waiting indicator.

FIG. 13 shows the situation when the receptor system is a text-based system. In the case of a voice message, blocks 1301-1309, designated for the text-only unified mailbox, the voice service, upon seeing that the destination does not have voice capabilities, may do several things:

1. The voice service may send a notification to the text-only unified mailbox telling the recipient that there is new voice mail waiting; or 2. The voice service may send a text version of the voice header to the text-only unified mailbox.

FIG. 14 shows the situation when the prime message receptor is a voice/text integrated system. Voice messages, blocks 1401-1408, designated for the voice/text integrated system, are sent in their entirety. Text messages, blocks 1420-1428, designated for the voice/text integrated systems, are also sent in their entirety. Recipients can now retrieve all their voice and text messages through one system 1409. All subsequent actions, blocks 1410-1418, are the same as those in FIGS. 12 and 13.

FIG. 15 shows the flow of messages between the service supporting the unified mailbox and the service integrated with the switch for alerting users of new messages. The service integrated with the switch 1502, which we will abbreviate UMM for unified messaging manager, serves both as a gateway to the switch and as a gateway to other switch-based messaging services. It turns the message waiting indicator on/off based upon requests from the unified mailbox. In turn, it queries the unified mailbox as to its status for users it serves. In addition, the unified mailbox can query UMM 1502 as to the status of messages for other services.

CONCLUSION

The underlying constructs of unified messaging can be extended beyond simply interpersonal messaging and voice/text media. All information exchange can be conceptualized as a form of a message, a form of communication. Unified messaging can encompass more than described herein. Basically, this expansion of the concept falls into two categories: (1) type of media in which the information is encoded; and (2) the intended purpose of the information being exchanged.

Within this specification, information has generally been discussed with reference to voice and/or data. However, the concepts disclosed can support any type of media and format for information exchange. For example, UMS can support the exchange of video images as messages or facsimile mail messages or voice-annotated text messages, etc.

In addition, the discussion herein has been in terms of interpersonal messaging and information exchange. Again, the concepts disclosed can support information exchange for any purpose. Systems could utilize the unified messaging architecture to exchange switch traffic information, usage reports, directory information and updates, business analysis information, etc. Expansion of our concepts is easily attained due to the modularity and flexibility of the underlying architecture developed to be independent of the information format/media and intended purpose of the information exchanged.

What is claimed is:

1. A message delivery arrangement for use in situations where a plurality of users send voice or data messages and wherein said messages have recipients and said data messages are typically delivered to data terminals and said voice messages are typically delivered to voice terminals, said arrangement comprising means controlled by a potential message recipient for designating either a voice terminal or a data terminal as a prime message receptor for said recipient and for sending a notification of the arrival of either a voice or a data message to said prime message receptor, and means controlled by said prime message receptor for alerting said recipient of said notification after receipt by said prime message receptor.

2. The invention set forth in claim 1 wherein said alerting is independent of said recipient's activity with respect to said receptor.

3. The invention set forth in claim 1 further comprising means controlled by said recipient and responsive to arrival of said voice or data message for retrieving said message from said receptor.

4. The invention set forth in claim 3 wherein said retrieving means is selectively controllable by said recipient.

5. The invention set forth in claim 3 wherein said retrieving means includes means for converting data messages into voice message equivalents when said receptor is designated to be said voice terminal.

6. The invention set forth in claim 3 wherein a sender sends a particular message using a predetermined terminal and said retrieving means includes means responsive to said particular message for generating information identifying said predetermined terminal.

7. The invention set forth in claim 3 wherein said retrieving means is responsive to a set of commands which are uniform for any designated receptor.

8. The invention set forth in claim 1 further comprising means for receiving messages from sources other than said plurality of users, and
means for providing notifications via said receptor for any messages received from such other sources.

9. A message delivery system for controlling the delivery of messages to message recipients, said messages communicable to one of said message recipients via a plurality of message networks and receivable by a plurality of control services associated with said one message recipient, sad system comprising
means for designating for said one message recipient any one of said control services as a prime message receptor and for sending to said prime message receptor a notification of the arrival of either a voice or a data message, and
means controlled by said prime message receptor for alerting said one recipient of said notification after receipt by said prime message receptor.

10. The invention set forth in claim 9 further comprising means controlled by said one recipient after being alerted for retrieving said message from said receptor.

11. The invention set forth in claim 10 wherein said retrieving means is controllable by said one recipient to provide said messages at a terminal selected by said one recipient.

12. The invention set forth in claim 11 wherein said retrieving means includes means for converting data messages into voice message equivalents when said terminal selected by said one recipient is a voice terminal.

13. The invention set forth in claim 10 wherein said retrieving means is responsive to a set of commands which are uniform for all said control services.

14. A consolidated message delivery system operable for providing notifications to a recipient of messages when messages are directed to either a voice or a data terminal, said voice and said data terminal are both associated with said recipient, said system comprising
means for receiving any said messages,
means for designating for said recipient either said voice terminal or said data terminal to receive said notifications, and
means responsive to messages directed to said voice or said data terminal for providing said notifications to said designated terminal independent of any request by said recipient.

15. The invention set forth in claim 14 wherein said notifications are provided independent of said recipient's activity with respect to said designated terminal.

16. The invention set forth in claim 14 further comprising means controlled by said recipient upon receiving said notifications for retrieving said messages from said designated terminal.

17. The invention set forth in claim 16 wherein said retrieving means is selectively controllable by said recipient.

18. The invention set forth in claim 16 wherein said retrieving means is responsive to a set of commands which are uniform for any designated terminal.

19. The invention set forth in claim 14 further including means for generating an abstract for any one of said messages, said abstract including pertinent information pertaining to said any one message.

20. The invention set forth in claim 19 wherein said generating means includes means for converting data messages into voice message equivalents when said designated terminal is said voice terminal.

21. The invention set forth in claim 20 wherein a sender sends a particular message using a predetermined terminal and said generating means includes means responsive to said particular message for generating information identifying said predetermined terminal.

22. A message delivery method for use in situations where a plurality of users send voice or data messages, said messages having recipients, said method comprising the steps of
designating, under control of a recipient, either a voice terminal or a data terminal as a prime message receptor for said recipient,
sending to said prime message receptor notifications of the arrival of either voice or data messages, and
alerting, under control of said prime message receptor, said recipient of said notifications.

23. The method set forth in claim 22 wherein said alerting step is independent of any activity of said recipient with respect to said receptor.

24. The method set forth in claim 23 further comprising the step of retrieving a voice or data message from said receptor by said recipient upon being alerted of receipt of said voice or data message.

25. The method set forth in claim 24 wherein said retrieving step includes the step of converting data messages into voice message equivalents when said receptor is said voice terminal.

26. The method set forth in claim 24 wherein a message sender sends a particular voice message using a predetermined terminal and said retrieving step includes the step of generating information identifying said predetermined terminal in response to said particular message.

27. The method set forth in claim 22 further comprising the step of receiving messages from sources other than said plurality of users, and
providing notifications via said receptor for any messages received from such other sources.

28. A consolidated message delivery method operable for providing notifications to a recipient of messages when messages are directed to either a voice or data terminal, said voice and said data terminal are both associated with said recipient, said system comprising the steps of
receiving any said messages,
designating for said recipient either said voice terminal or said data terminal to receive said notifications, and
providing, in response to messages directed to said voice or said data terminal, notifications to said designated terminal independent of any request by said recipient.

29. The method set forth in claim 28 wherein said notifications are provided independent of said recipient's activity with respect to said designated terminal.

30. The method set forth in claim 28 further comprising the step of retrieving, under control of said recipient, a message from said designated terminal.

31. The method set forth in claim 30 wherein said retrieving step is selectively controllable by said recipient.

32. The method of claim 28 further including the step of generating an abstract for any one of said messages, said abstract including pertinent information pertaining to said any one message.

33. The method set forth in claim 32 wherein said generating step includes the step of converting data messages into voice message equivalents when said designated terminal is said voice terminal.

34. The method set forth in claim 33 wherein a sender sends a particular message using a predetermined terminal and said generating step includes the step of generating information identifying said predetermined terminal from said particular message.

* * * * *

UNITED STATES PATENT AND TRADEMARK OFFICE
CERTIFICATE OF CORRECTION

PATENT NO. : 4,837,798
DATED : June 6, 1989
INVENTOR(S) : Roberta S. Cohen et al It is certified that error appears in the above-identified patent and that said Letters Patent is hereby corrected as shown below:

Title page:

Inventors should appear as follows:

--(75) Inventors: Roberta S. Cohen, Middletown, NJ
Kenneth M. Huber, Red Bank, NJ
Deborah J. Mills, Oberlin, OH
Myron E. Drapal, Lafayette, CO
Janis R. Osterweil, Corona Del Mar, CA --.

Signed and Sealed this

Tenth Day of October, 1989

*Attest:*

DONALD J. QUIGG

*Attesting Officer*  *Commissioner of Patents and Trademarks*